(12) United States Patent
Munz (10) Patent No.: US 7,581,464 B2
(45) Date of Patent: Sep. 1, 2009

(54) THUMB THROTTLE VEHICLE CONTROLLER

(75) Inventor: David Munz, 45 Alexine Ave., East Rockaway, NY (US) 11518

(73) Assignee: David Munz, East Rockaway, NY (US)

( * ) Notice: Subject to any disclaimer, the term of this patent is extended or adjusted under 35 U.S.C. 154(b) by 151 days.

(21) Appl. No.: 11/827,976

(22) Filed: Jul. 13, 2007

(65) Prior Publication Data

US 2009/0013816 A1 Jan. 15, 2009

(51) Int. Cl.
*G05G 11/00* (2006.01)
(52) U.S. Cl. .................... 74/489; 74/500.5; 74/501.6
(58) Field of Classification Search ............. 74/484 R, 74/486, 487, 488, 489, 500.5, 501.6
See application file for complete search history.

(56) References Cited

U.S. PATENT DOCUMENTS

| 5,775,167 | A * | 7/1998 | Maietta .................... 74/480 R |
| 7,010,955 | B2 * | 3/2006 | Suzuki ....................... 73/1.79 |
| 2004/0173045 | A1 * | 9/2004 | Hancock et al. ............... 74/544 |
| 2005/0011300 | A1 * | 1/2005 | Gates .......................... 74/544 |
| 2005/0028718 | A1 * | 2/2005 | Bernier et al. .......... 114/144 R |
| 2006/0225937 | A1 * | 10/2006 | Lemoine ..................... 180/219 |
| 2008/0141819 | A1 * | 6/2008 | Poulos et al. ............... 74/502.2 |

* cited by examiner

*Primary Examiner*—David M Fenstermacher (57) ABSTRACT

An improved vehicle throttle control mechanism in which a member captures the movement of an operators thumb beneath the underside of the said vehicle's handlebar. The operator is able to actuate the throttle without removing his thumb or the palm of his hand from contact with the handle bar. Other elements of the control system reduce operator fatigue and improve vehicle control.

18 Claims, 6 Drawing Sheets

THUMB THROTTLE VEHICLE CONTROLLER

BACKGROUND OF THE INVENTION (1) Field of the Invention

This invention relates to the improvements in the engine throttling of vehicles, particularly motorcycle, snowmobiles, and all terrain vehicles which are steered using handlebars and whose engine output is regulated by a thumb throttle control.

(2) Description of Related Art

Thumb throttles controls are standard equipment on nearly all snowmobiles and the majority of all terrain vehicles. Thumb throttle controls currently in use capture the motion of the thumb moving towards the handle bar which limits the ability of an operator to grip the handlebar or perform other functions with their hand while operating the thumb throttle controller. The advantage of this design is that the thumb is being pulled towards lever by the whole hand so the operator can overcome the resistance of a strong throttle return spring deal well with the fatigue induced by constantly having to resist the force of the throttle return spring. On vehicles equipped with sliding valve throttle bodies operator's hands receive additional fatigue trying to resist the movement of the sliding valve every time the vehicle is jostled around as it strikes any kind of bump. This phenomenon also reduces both vehicle control and forces the use of overly heavy return springs to reduce the tendency of the throttle blade to be bounced open.

U.S. Pat. No. 7,086,379 details the use of an secondary electronically controlled throttle body to improve the performance of a motorcycle equipped with a traditional twist grip throttle controller coupled directly to the primary throttle body by a traditional wire cable.

U.S. Pat. No. 7,010,955 describes the use of a throttle by wire throttle control setup on a motorcycle using data taken from a rotating handlebar grip. No mention is made of the use of any kind of sliding or hinging throttling member.

U.S. Pat. Nos. 6,889,654 and 6,699,085 describe how data taken from a finger actuated lever on the handlebar of a personal watercraft can be used to control the throttling of the watercraft's engine. Mention is made of using this throttling device on other vehicles. The throttle control device cited in the patent is unlike my thumb throttle device in that it consists of a lever mounted in front of the handlebar. The lever is pulled toward the handlebar by the index finger. No mention is made of a throttle control using a sliding member or of a thumb throttle control. The advantage of such a system is cited as being the ability to reduce the amount of return spring necessary to move the throttling lever to its rest position. No mention is made of reducing rider fatigue by decoupling the throttle control lever from the reciprocating mass in the engine's throttle body.

U.S. Pat. No. 5,775,167 describes the use of an additional throttle lever in conjunction with a traditional thumb throttle. This additional throttle is actuated by the index finger in a manner similar to the throttles employed on some personal watercraft and depicted in U.S. Pat. Nos. 6,889,654 and 6,699,085. No mention is made of improving thumb throttle performance using any of the techniques detailed in my claims.

U.S. Pat. No. 6,658,965 details the design of a thumb actuated throttle which rotates around the handlebar mimicking the motion of a traditional twist grip throttle controller.

U.S. Pat. No. 4,899,610 details the use of a thumb throttle, which pivots about two points so that rider fatigue is reduced by altering the mechanical advantage of the mechanism at different throttle openings. The disadvantage of this approach is a loss of throttle control.

SUMMARY OF THE INVENTION

The prior art designs of thumb throttle controls have many flaws that have restricted their use to snowmobiles, all terrain vehicles, and some watercraft. The use of thumb throttle controls on motorcycles is very rare and their use is typically by riders who as a result of an injury cannot properly operate a twist throttle. All designs that I am aware of force the operator's thumb to loose contact with the handlebar while the throttle is being actuated. This makes it difficult for the operator to hold onto the handlebar during harsh decelerations or impacts. Impacts sometimes result in operators fracturing their thumbs. This new thumb throttle controller concept allows the heel of the operators thumb and his palm to remain in constant contact with the handlebar so the operator is unrestricted in his ability to apply the brakes regardless of whether the throttle is being regulated. Since the outstretched thumb is not being thrust towards the throttle lever, in the event of an accident, injury to the thumb or inadvertent actuation of the throttle are unlikely with my improved design. With this design, the motion of the thumb moving across the underside of the handle bar is captured by a moving member that can hinge about a point in the vicinity of the handlebar, follow a sliding path, or move along a path generated by a mechanical linkage composed of two or more members.

Since this new thumb throttle controller can be actuated without removing ones hand from the handlebar, the remaining fingers are free to easily apply the front brake lever simultaneously while actuating the throttle. This is a unique advantage on motorcycles and all terrain vehicles because it allows the operators to us the front brake to reduce weight on the vehicles rear wheel or wheels so that an excessive amount of throttle can be used to break the rear wheel or wheels free. The vehicle can than be aggressively steered by using the throttle to keep the rear wheels spinning faster than the road surface to induce controlled over steer.

The use of thumb throttles on motorcycle over conventional twist grip throttle controls is that when a motorcycle is equipped with a thumb throttle controller of my design the throttle can be controlled without changing the relationship between the palm of the hand and the handlebar. As such a rider can easily modulate the throttle while shifting his body weight around the motorcycle, or steering the motorcycle and be confident that these motions will not be translated into an unwanted addition or reduction in engine output. When using a motorcycle with a traditional twist grip throttle controller it is difficult to maintain steady throttle control whenever your arm moves in relation to the handlebar. This inherent design flaw of twist throttles becomes painfully apparent when road-racing motorcycles go into high speed oscillations. During these episodes the handlebars are flung wildly from side to side causing the rider is inadvertently add and remove throttle in synchrony with the motion of the handlebars. The addition and subtraction of thrust to the motorcycle drives the oscillation which resulting in a complete loss of control over the motorcycle. Conventional thumb throttle designs make it difficult for a rider operating the thumb throttle to hold onto the motorcycle while braking. Without such control aggressive maneuvers such as Scandinavian flicks are difficult or impossible to perform on motorcycles.

While operating a traditional vehicle equipped with a thumb throttle, an operator's thumb is fatigued both by having to overcome the static force exerted by the throttle's return spring, and by having to counter the dynamic forces that are applied to the sliding throttle valve when the vehicle strikes and obstacle. Throttle return springs must be sufficiently strong enough to not only close the throttle when the thumb throttle controller is released, but also have sufficient tension to prevent the throttle valve from bouncing off its seat when the vehicle strikes an impact. Essentially, sufficient force must be applied to the sliding valve by either the throttle return spring when in the closed position, or by the operators thumb when in an opened position to accelerate said valve so that its position relative to the vehicle does not change when the vehicle is accelerated upward by an impact. Should the rider or spring be unable to apply sufficient force to accelerate the sliding throttle valve in harmony with the vehicle, there will be an inadvertent change in engine output and ultimately vehicle control.

By counterbalancing the sliding throttle valve with an appropriate mass or masses so that when it is moved a proportional amount of total mass is moved in an opposing direction, fatigue to the rider can be significantly reduced and vehicle control can be improved. If the throttle valve is properly coupled to an appropriate amount of mass moving in an opposing direction, the throttle valve's position in the slide will not be affected when the vehicle strikes a bump. Consequently a lighter return spring can be implemented, as there will no longer be any tendency for the throttle valve to bounce off its seat. Fatigue to the operator's hands will be reduced, as they will no longer be straining to hold the throttle against an overly strong return spring. Rider fatigue attributed to the dynamic effects of having to hold the throttle slide valve open when striking obstacles are completely eliminated. The counterbalancing mass or masses need not equal the mass of the sliding throttle valve. Provided that the ratios of mass movement to throttle slide movement is linear, masses heavier, or lighter than the sliding throttle valve can be moved appropriate amounts in directions opposing the motion of the sliding throttle valve. The masses can be moved in directions opposite to the throttle blade by a variety of mechanisms including levers, hydraulic cylinders, gears and gear racks, belt drives, chain drives, or by tensioned cables.

In applications where there is insufficient room in the vicinity of the sliding throttle valve to couple the balancing mass and the mechanism which couples it to the sliding throttle valve, a separate mechanism can be used to balance the sliding throttle valve while still using a conventional thin cable to pull the sliding throttle valve open. This is achieved by using a combination of an additional mass that is able to move in a direction opposite to the motion of the throttle valve slide. The motion of this additional mass and the sliding throttle valve must both be countered by sufficiently strong return springs to maintain tension in the cable, belt, or chain that couples them together. While these two return springs oppose one another, in order for the throttle to return to its closed position and not some arbitrary partially open condition when the throttle controller is released, a third spring coupled to a falling rate generating mechanism must be incorporated into the mechanism to close the throttle.

There are many advantages to using an electronic sensor to capture the position of the vehicle's throttle controller and to use that information to control an actuator that opens and closes the throttle. A return spring built directly into the throttle controller can be designed with much less initial preload because, unlike a tradition return spring it doesn't not need to generate sufficient force to actually close the throttle and overcome the inherent friction in the cable or hydraulic system which couples the throttle controller to the throttle. Where a sliding valve type throttling valve is in use, the thumb is no longer has to exert additional force to keep the throttle blade open every time the vehicle strikes a bump. The relationship between throttle controller and the actual opening of the throttle can be tailored to improve drivability or to suit particular riding terrain. A microprocessor can take into consideration what gear the motorcycle is in, that the engine being controlled has a nonlinear torque curve, the current atmospheric conditions, rider ability, wheel speed sensor data to determine vehicle traction, or even what rpm the engine is operating at.

BRIEF DESCRIPTION OF THE DRAWINGS

The following drawing will help to describe by example this invention.

DRAWINGS—REFERENCE NUMERALS

DETAILED DESCRIPTION

Figure 1:
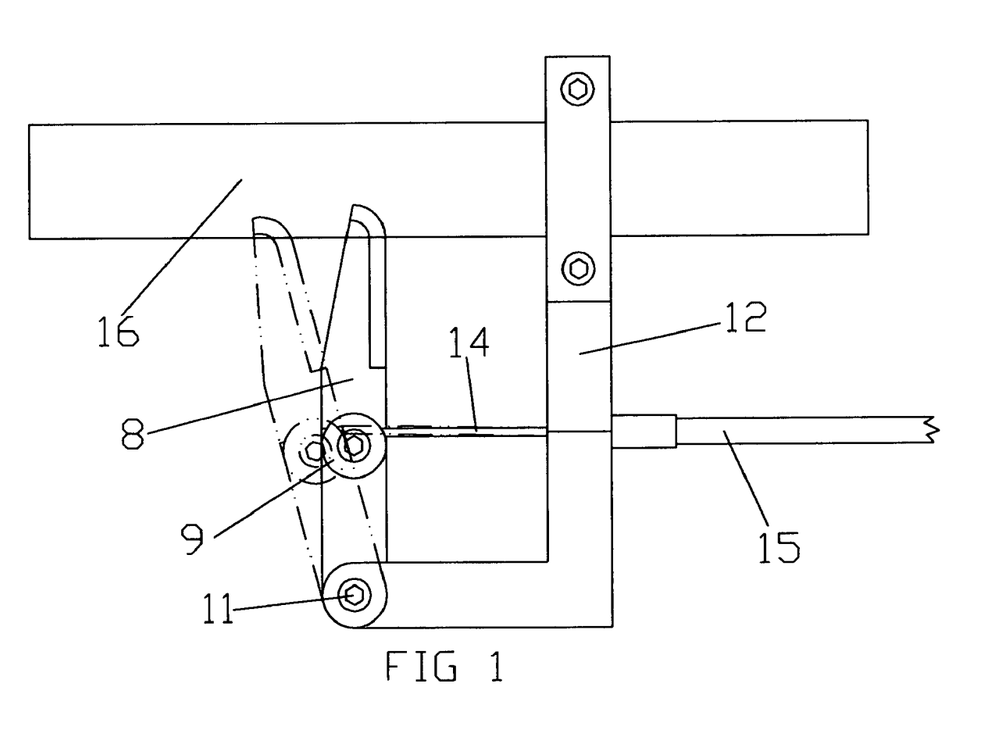
FIG. 1 shows an overhead view of my thumb throttle actuator mounted to a handlebar
Figure 2:
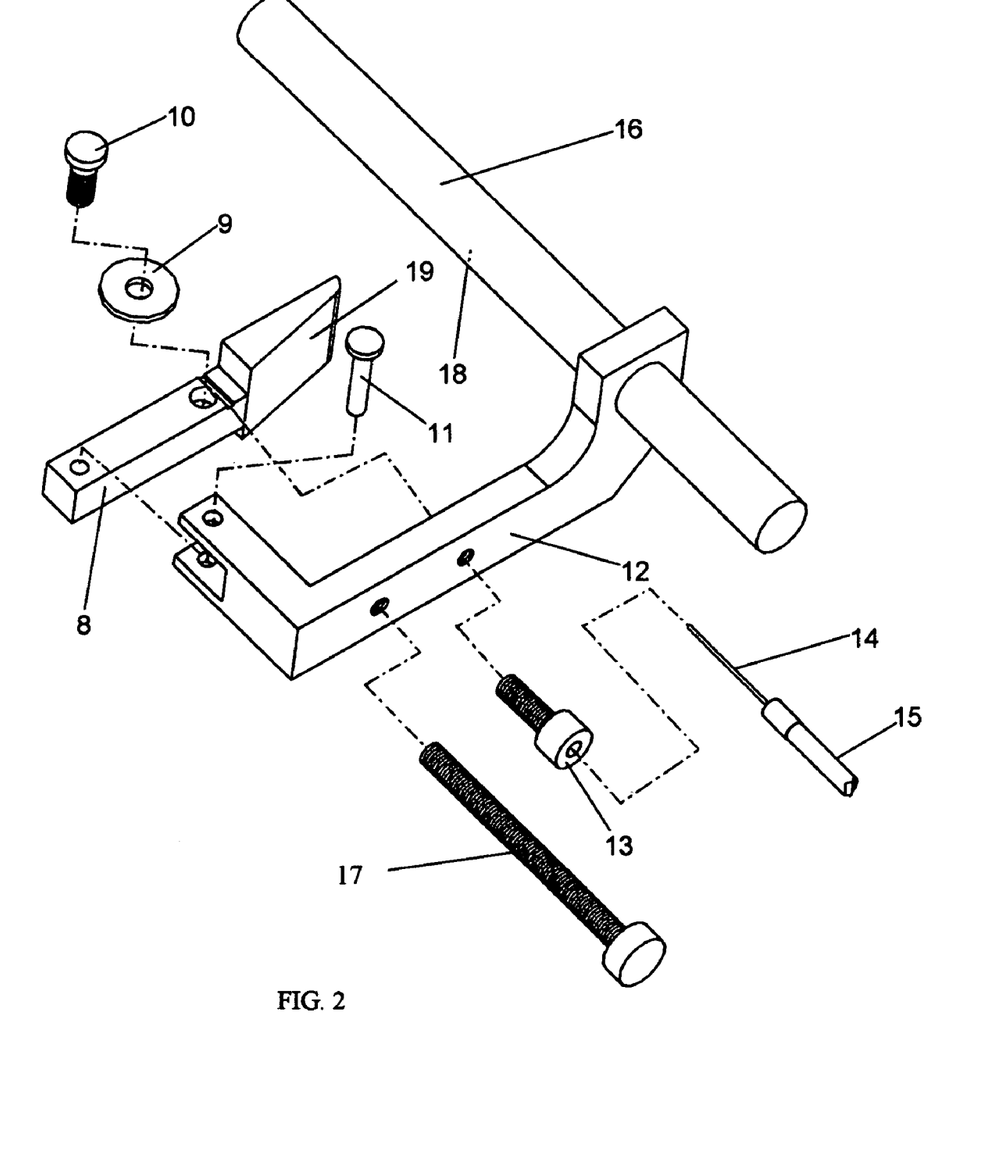
FIG. 2 shows an isometric exploded view of the thumb throttle actuator mounted to a handlebar as shown in FIG. 1.

FIGS. 1 and 2—Preferred Embodiment

A preferred embodiment of the thumb throttle control is illustrated in FIG. 1. (top view) and FIG. 2. (exploded isometric view). The thumb throttle control as shown in FIG. 1. depicts in solid lines the most critical parts of the mechanism when it is at rest. One end of the mount 12 attaches to the rotating member 8, via a pivot 11, while the other end of the mount secures the device to the vehicle's handlebar 16. The rotating member is situated in such a manner that the end furthest from it's center of rotation is in the vicinity of the handlebar. The throttle cable 14 is attached to the rotating member 8 at a location between the point on the rotating member 8 closest to the handlebar 16, and the pivot 11. The throttle cable 14 runs inside the throttle cable sheath 15 that is affixed to the mount 12. The rotating member 8 is rotated from it rest position which is depicted in solid lines to a second position as shown by the dashed line by the users thumb which rest against the rotating member 1 on the portion of the member which is in close proximity to the handlebar. The rotating member pulls on the throttle cable 14 causing the throttle cable 14 to shift inside of the throttle cable sheath 15 because the throttle cable sheath is affixed to the mount 12.

An exploded isometric view of the thumb throttle control is shown in FIG. 2. Note the addition of several additional parts including the throttle cable clamp 9 and the throttle cable clamp bolt 10 that secure the throttle cable 14 to the Rotating Member 8. A cable length adjuster 13 attaches the throttle cable sheath 15 to the mount 12. Adjusting the depth that it threads into the mount 12 alters the relationship between the throttle cable 14 and the throttle sheath so that the thumb throttle controllers can be properly synchronized to the engine's air inlet restrictor or restrictors. To prevent the throttle from being inadvertently opened when the throttle cable sheath 15 is pulled out of the cable length adjuster 13 some method must be employed to hold the two parts together at all times. A throttle return stop 17 determines the rest position of the rotating member 8 in relation to the mount 12.

The thumb throttle controller depicted in FIG. 1. and FIG. 2. would be affixed to the vehicle's right handlebar. The operator would grasp the handlebar to the right of the mount 12 with their thumb positioned below the handlebar and their remaining fingers on top of the bar and either gripping the bar or the brake lever. With their hand in it's proper position their thumb is in contact with both the working surface 19 of the rotating member 8 and the underside of the handlebar 16. By sliding their thumb towards the end of the handlebar and away from the mount they cause the rotating member 8 to rotate around the pivot 11. The throttle cable 14 is thus pulled causing a shift in the relationship between it and the throttle cable sheath 15. This shift in the relationship of the throttle cable 14 to the throttle cable sheath 15 is transmitted to the air inlet restrictor, which regulates the engine's power output.

Figure 3:
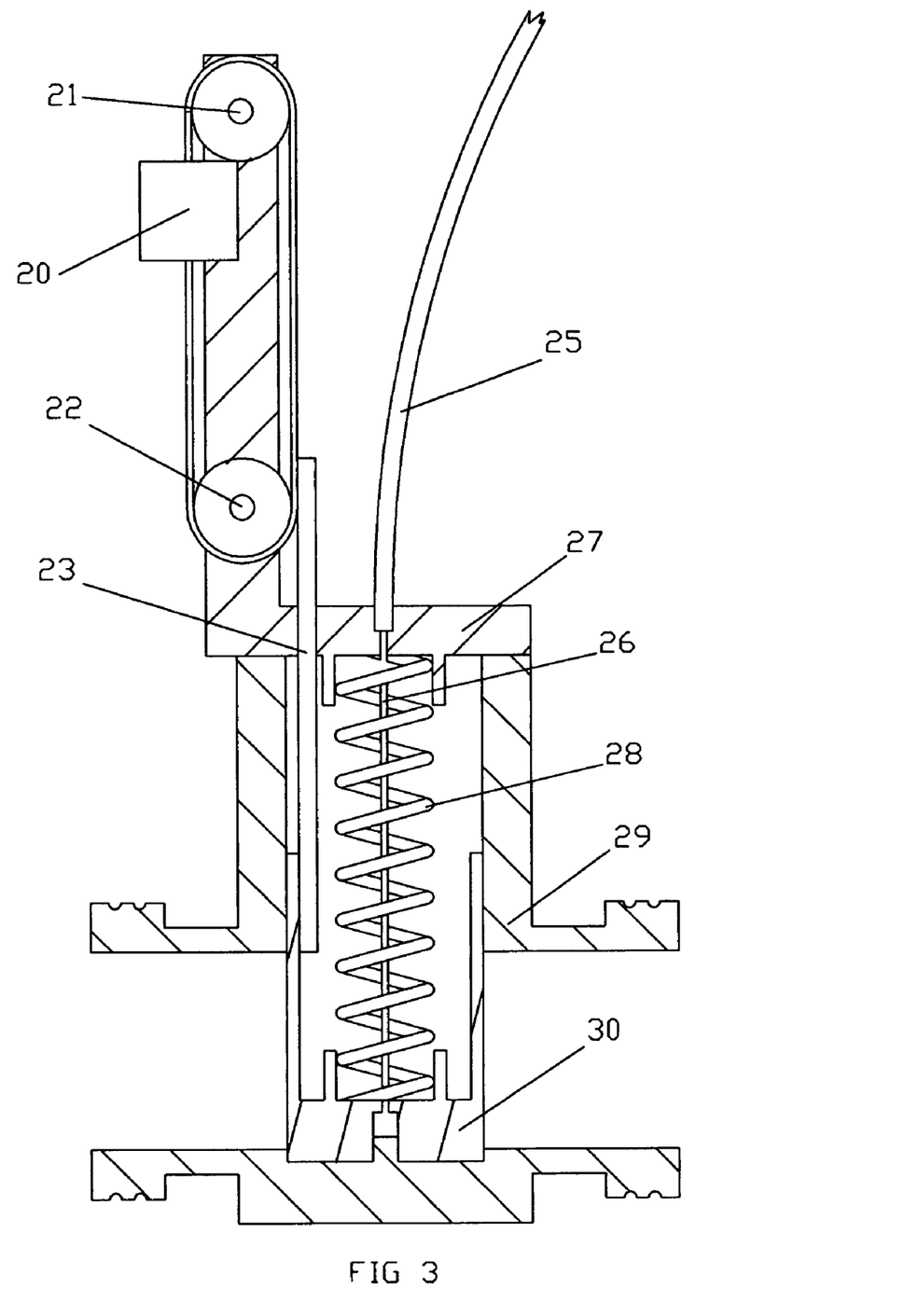
FIG. 3 shows a side view of an engine inlet air restrictor fitted with a counterbalanced throttle blade.

FIG. 3.—Additional Component

A possible embodiment of an engine air inlet restrictor whose throttle blade is counterbalanced by a suitable mass is shown in illustration FIG. 3. Said engine air inlet restrictor consists of a throttle body 29 through which air or a mixture of air and fuel can pass when the throttle blade 30 is moved from its rest position as shown. The return spring 28 holds the throttle blade in a closed position until sufficient tension is place on the throttle cable 26 to overcome the force exerted on the throttle blade 30 by the return spring 28. The throttle cable is connected to the thumb throttle actuator by the throttle cable 26 and the throttle cable sheath 25 through which the said throttle cable 26 runs. The throttle blade 30 is connected to the connecting member 23 that links its motion to a belt 24. When said throttle blade 30 moves the belt 24 is moved an identical amount. The belt is wrapped around a lower pulley 22 and an upper pulley 21. On the side of the belt opposite where the said connecting member 23 is connected to the belt, a mass 20 proportional to that of the throttle blade 30 and a fraction of the return spring 28 is affixed to the belt. Said mass 20 is moved in a direction opposite that of the throttle blade 30 whenever the throttle blade is moved to open or close the air inlet restrictor. Said return spring 28 need only impart sufficient force on the throttle blade to overcome the friction in the device as the throttle blade 30 will show no tendency to move when the vehicle in which the inlet air restrictor is used is impacted. With this arrangement there should be no net mass movement other than that of the throttle cable when the air inlet restrictor is opened or closed.

Alternative embodiments of this air inlet restrictor could used other means to move the throttle blade 30 such as belting, chain, solid members, gear racks, hydraulic cylinders, or any alternative member acting in tension.

A mass could be moved in a direction opposing the movement of the throttle blade by using a system comprising of a gear train driving a gear rack. Another possible method would have some alternative tensioned member running around two or more points to which both a throttle blade and a mass are connected.

A lever arm could also be used to impart a motion on a mass that is opposite that of a throttle blade. A mass could be coupled to a throttle blade by a hydraulic system.

In an actual production version of this device, all components would likely be encased in a protective cover to prevent foreign material from interfering with the workings of the device.

A version of this device in which the moving mass and throttle blade are connected by only a flexible tensioned member will share some of the advantages of this design but the tendency of the throttle blade to bounce off its seat will not be restricted much. Rider fatigue will be reduced.

Figure 4:
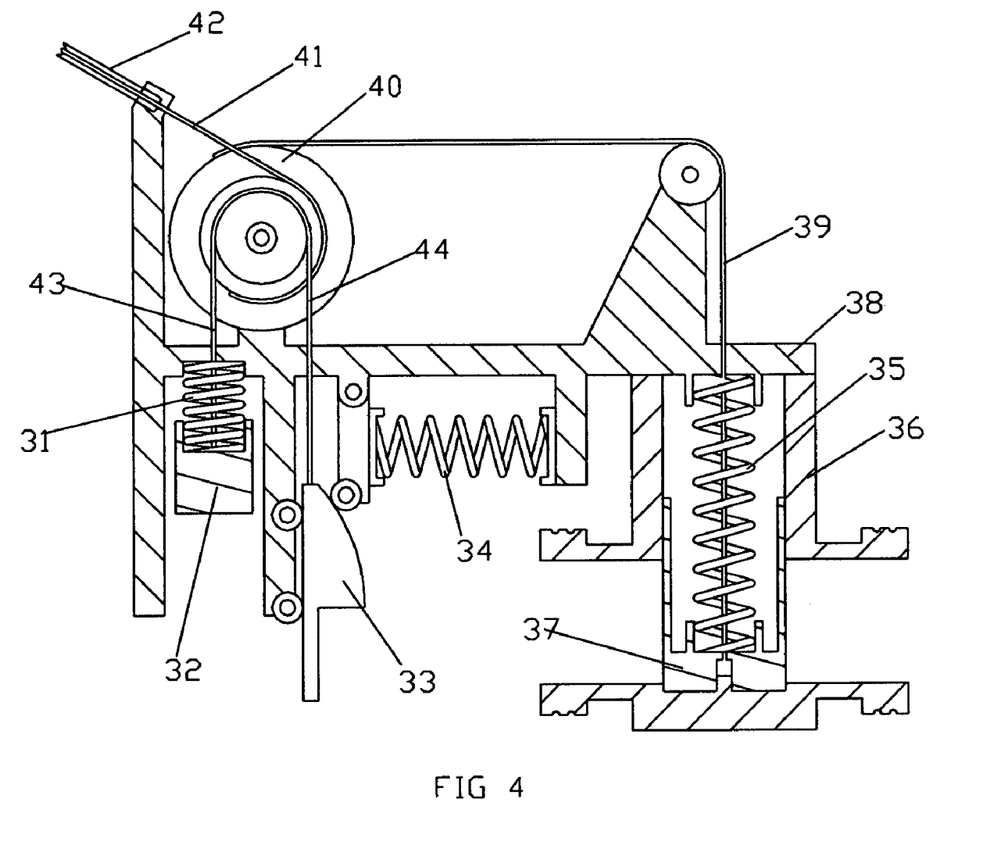
FIG. 4 shows an alternative method of counterbalancing the mass of the slide valve in an engine inlet air restrictor.

FIG. 4.—Additional Component

A second possible embodiment of the engine air inlet restrictor shown in FIG. 4. is invaluable in situations where there is insufficient room on top of the cap 38 for an mechanism such as said connection member 23 to translate the motion of a throttle blade outside of the throttle body 37. As with the engine air inlet restrictor depicted in FIG. 3. the, mechanism consist of a throttle body 36 in which a throttle blade 37 is moved by the intermediate throttle cable 39. Since an unsupported cable can act only in tension and not in compression the return spring 35 must have sufficient preload to maintain tension in the throttle cable 39 at all times.

Traditional sliding throttle blade air inlet restrictors 37 fitted with sufficiently preloaded return springs 39 have a number of disadvantages. The heavy return spring 39 fatigues the operator diminishing both their control over the vehicle and it detracts from their riding experience. Though the heavy return spring 39 maintains constant tension in the throttle cable, it doesn't eliminate the variations in the force the operator must exert on the throttle lever when the vehicle is impacted and the throttle blade 37 wants to move independently of the vehicle.

One method of alleviating these issues is to connect the throttle blade 37 to a second mass 32 or masses whose motion is opposite that of the throttle blades. Note that in FIG. 4., the mass 32 is not connected to the intermediate throttle cable 39 and is instead connected to a second cable, the mass cable 43. Since both the intermediate throttle cable 39 and the Cam Cable 44 are connected to the same roller 40, they can have different masses provided the ratio of their mass to travel distance is relative to one another. For instance if the throttle blade 37 weights one pound and travels a total of one inch, then if the mass was running on a smaller diameter portion of the roller 40 than the throttle blade 37 and only moved one inch, then the mass would have to weigh two pounds to counterbalance the throttle blade.

Since tension must always be maintained in the mass cable 31 to maintain a proper weight balance between the throttle blade 37 and the mass 32, a mass preload spring 31 is used to keep tension on the mass cable 43. The mass preload spring 31 serves a second function in that it balances out the exorbitant amount of preload in the return spring 35. However, with both springs functioning in the system, the throttle's rest position will be somewhat open. In an ideal world both the mass preload spring 31 and the return spring 35 would have sufficiently low spring rates such that a mass preload spring 31 could be specified with slightly less preload than is found in the return spring 35. The mass preload spring 31 would have sufficient preload to tension the mass cable 43 and balance out most of the preload on the return spring 35. As the throttle was opened, the amount of force exerted by both springs would change so minimally that the force exerted by the return spring 35 would not grow so great as to fatigue the operator, and the mass preload spring would maintain sufficient force to keep tension in the mass cable 43 and balance out the force exerted by the return spring 35.

Since space constrains and design realities prevent us from obtaining springs with these ideally super low spring rates, the addition of a falling rate spring arrangement to the mechanism is necessary. A mass preload spring 31 is selected so that when the throttle blade 37 is open it can supply nearly as much force as the fully compressed return spring 35 is generating. The heavier mass preload spring 31 overpowers the return spring 35 holding the throttle wide open when the system is in equilibrium. To shift the equilibrium between the mass preload spring 31 and the return spring 35, a second spring, the cam loader spring 34 works against the moving cam 33 which is connected to the roller 40 by the cam cable 44. This arrangement bolsters the efforts of the return spring 35 to hold the throttle blade 37 closed when the system is at rest. As the throttle blade 37 is opened by turning the roller 40, the tension on the cam cable, which is balancing out the efforts of the mass preload spring 31 and the return spring 37, actually decreases. By tuning the profile of the cam 33 properly the engine air inlet restrictor in FIG. 4. can be configured so that in its rest position the throttle is closed. Minimal effort is necessary to open the throttle blade 37, and the force necessary to open or close the doesn't change appreciably.

As with the air inlet restrictor described in FIG. 3., a cable, the main throttle cable 41 connects the air inlet restrictor to the thumb throttle actuator mounted on the vehicle's handlebars. The throttle cable sheath 42 preserves the distance of the path the main throttle cable 41 must take between the thumb throttle actuator and the air inlet restrictor. All elements of the device depicted are integrated into the cap 38 that is affixed to the throttle body 36.

Alternative embodiments of this design concept could be mounted independently of the throttle body and connected to the throttle body only by a cable and some mechanism to preserve the distance the cable must travel between the two mechanisms.

A production version of this design would have all of the components enclosed in a closed shell to prevent foreign matter from interfering with the function of the device. The single mass preload spring 31 and the cam loader spring 34 might each be replaced by two or more springs doing the same function. To make all springs in the system function with much lower spring rates, several springs might be nested together. In this arrangement two or more coil springs would be arranged inside of one another so that the several short springs worked in unison to emulate the characteristics of a much longer spring as would be formed if all of the springs were connected end to end.

Figure 5:
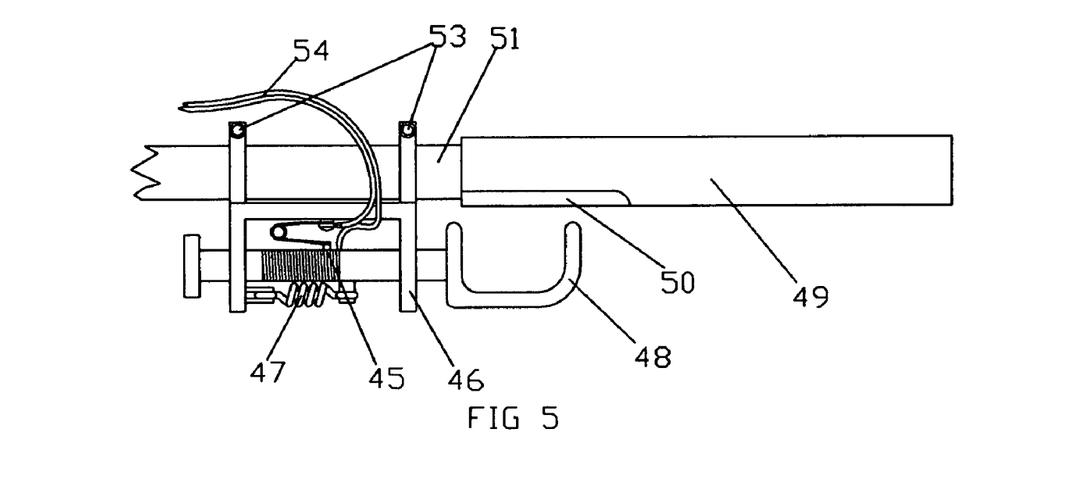
FIG. 5 shows an alternative design of the thumb throttle actuator with a build in electrical rheostat mounted to a handlebar.

FIG. 5.—Additional Component

An alternative design to what is depicted in FIG. 1 is shown in FIG. 5. In the thumb throttle controller depicted in FIG. 5. a member, the contact slide 48 which slides parallel or close to parallel with the underside of the vehicle's handle bar. The contact slide 48 captures the motion of the operator's thumb using an electrical rheostat 45 that translates this information from the throttle with electrical wires 53. The contact slide 48 slides through the body 46 that is secured to the handlebar 51 by two fasteners 52. A return spring 47 returns the contact slide 48 to a rest position when not actuated by the operator. A sliding surface 50 built into the grip 49 facilitates the motion of the thumb along the underside of the handlebar when the operator opens or closes the contact slide 48.

Many variations on this design are possible. A production version of this thumb throttle actuator would have the internals of this mechanism completely encased by a protective shield to prevent foreign matter from damaging its internals. A suitable seal would be used to prevent foreign liquids or matter from passing through any mating surfaces between the contact slide 48 and the body 46.

Alternative variations of this sliding thumb throttle controller might add a member to the contact slide to close up the loop that the thumb is placed in so that the thumb isn't slid against the underside of the handlebar which would reduce the wear to the rider's gloves and make throttle control more precise. The handlebar could be custom shaped with a recess built into the underside of it to better accommodate the thumb throttle control.

A sliding thumb throttle controller as depicted in FIG. 5. can be linked to the throttle body with a traditional throttle cable, a hydraulic line, or an electrical or optical signal generated by a device other than the rheostat which can measure the displacement of the contact slide.

Figure 6:
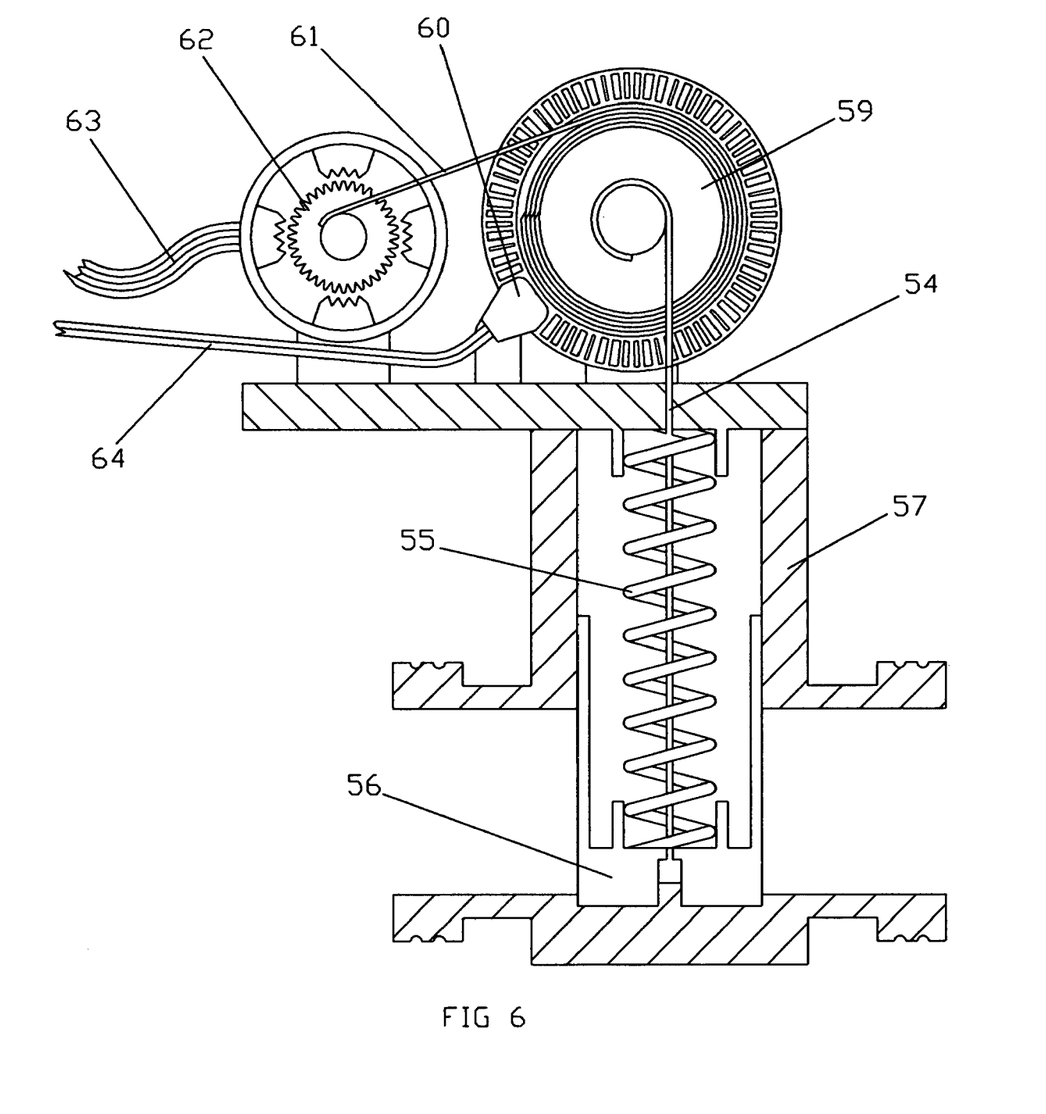
FIG. 6 shows an engine inlet air restrictor, which has been retrofitted with a stepper motor and an angular position sensor.

FIG. 6.—Additional Component

An alternative design of what is depicted in FIG. 3. and FIG. 4. By using a stepper motor 62 to generate the motion which raises and lowers the throttle blade 56 running inside of the body 57, this air inlet restrictor shown in FIG. 6. can be operated with only an electrical connection to the thumb throttle actuator and an electrical power source.

This design differs from a conventional air inlet restrictor in that attached to the cap 58 is a stepper motor 62 connected by a belt 61 to a reduction pulley 59. The said reduction pulley 59 incorporates a portion of the position sensor 60 and has two running surfaces. The belt 61 connected to the stepper motor 62 is wrapped around the larger diameter running surface. The throttle cable is wrapped around a running surface with a smaller diameter. This arrangement provides some mechanical advantage for the stepper motor so a motor of reasonably low torque output has sufficient rotational torque to work against the return spring 55 which much have sufficient preload to prevent the throttle blade 56 from inadvertently bouncing from its rest closed position.

A functioning version of the device shown in FIG. 6. would have the stepper motor 62, the belt 61, the position sensor 60, and the reduction pulley 59 enclosed in a protective cover to prevent foreign material from interfering with mechanism and to keep the internals lubricated if necessary.

The wrapped belt used to translate the rotation of the rotary motion generator which in FIG. 6. is a stepper motor 62 could be replaced by any other means of translating rotating motion from one shaft to another. Examples include using the same wrapped arrangement with another suitable flexible tension member such as a piece of wrapped fabric or wire. The shaft of the rotary motion generator and the rotating member that pulls the throttle cable 54 could also be linked by more conventional means such as a direct coupling, a gear drive, a chain drive, or a belt drive. Where necessary, to bolster or capitalize on the torque output of the rotary motion generator additional gear trains could be employed in the mechanism.

The stepper motor is powered and controlled by signals carried to it by the stepper motor wiring 63. These electronic pulses are generated by a micro controller which using a combination of data from an electronic thumb throttle control and feedback signals generated by the position sensor 60 which are fed back to said micro controller along the position sensor wiring 64.

Other rotary motion generators could be employed including but not limited to servo motors and hydraulic motors. Servo motors could be used with or without feedback circuits to determine throttle position. The use of a system that can measure throttle blade movement has the advantage of being configurable for use on motorcycles with different amounts of throttle blade travel.

Elements of the mechanisms described in FIG. 3. and FIG. 4. can be employed in the device shown in FIG. 6. to reduce the necessary torque output of whatever device is providing the necessary motion to move the throttle blade.

The throttle blade could be moved by a mechanism that doesn't rely on using a flexible member wrapped around a rotating shaft to pull a cable. An example would be to use a rotating screw thread to impart linear motion either directly or indirectly on the throttle blade. The throttle blade could be moved by a hydraulic, pneumatic, or vacuum actuator.

Figure 7:
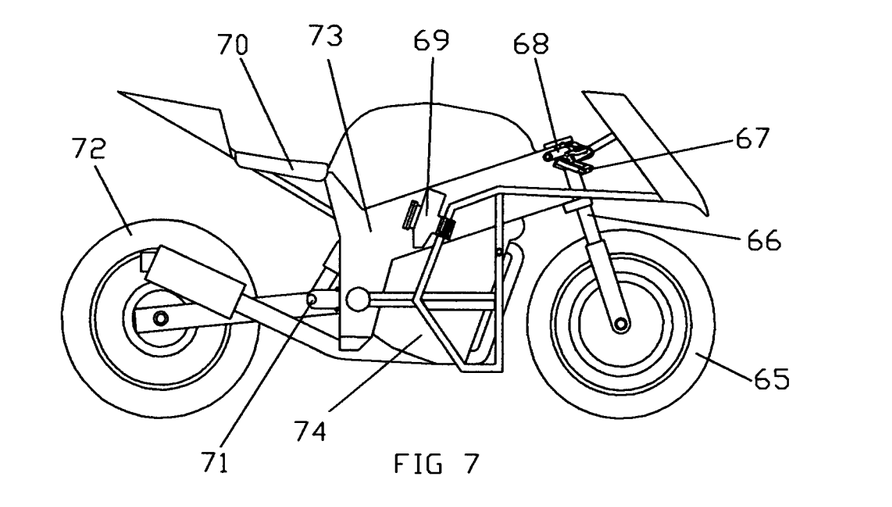
FIG. 7 shows a side view of a motorcycle retrofitted with a thumb throttle actuator and a engine air inlet restrictor with a counterbalanced throttle blade.

FIG. 7.—Additional Component

Shown in FIG. 7. is a right side view of a typical motorcycle which would be fitted with a thumb throttle control and an air inlet restrictor as described in this patent. A motorcycle consists of a frame 73 that holds an engine 74 and is connected to a front steering system 66. Connected to the front steering system 66 is the front wheel 65 and the handlebars 68. Connected to the frame 73 either directly or by the means of a rear suspension system is the rear wheel 72. Positioned in front of the rear wheel 72 are the footpegs 71 on which the rider place their feet. Located on top of the footpegs 71 is a seat 70 on which the rider sits. The rider reaches forward to place their hands on the handlebar or handlebars 68 on motorcycles with separate right and left handlebars. Mounted to the right handlebar 68 is the thumb throttle control 67 that the rider modulates to control the engine's power output. The thumb throttle control 67 is connected to one or more air inlet restrictors 69 that limit the air flowing to the engine so as to regulate the engine's power output.

Figure 8:
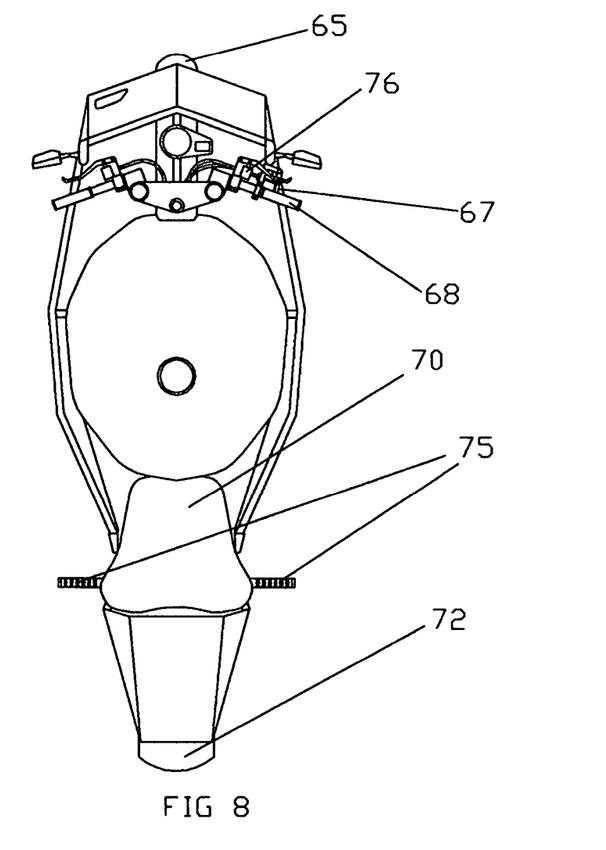
FIG. 8 shows a top view of a motorcycle fitted with an thumb throttle actuator.

FIG. 8.—Additional Component

Shown in FIG. 8. is an overhead view of typical motorcycle which would be fitted with a thumb throttle control. Note the rear tire 72 that extends beyond the back of the motorcycle. Extending from the left and right sides of the motorcycle are the foot pegs 75 on which the riders rests their feet. On the motorcycle shown the seat 70 is mounted between the two foot pegs 75. The seated rider leans forward their left and right hands on the appropriate handlebars 68 which are moved to steer the front tire 65. Mounted to the right handlebar is the thumb throttle control 67 which the rider actuates with their right thumb in order to regulate the speed of the motorcycle. The location of the moving member in the thumb throttle control 67 below the handlebar 68 allows the rider to modulate the thumb throttle control 67 and the brake lever 76 simultaneously.

What is claimed is:

1. A throttle control mounted to the handlebar of a vehicle:
    a) where said handlebar has a tubular cross section;
    b) an elongated pivotable member exists in close proximity to said handlebar;
    c) on one end of said pivotable member is a pad against which a rider's thumb would press;
    d) on the end said pivotable member opposite the end with the pad is a pivot;
    e) said pivotable member rotates about the pivot;
    f) at least one member constrains the location of said pivot in relation to said handlebar;
    g) the axis of rotation of said pivot is no less than two inches from the center of the cross section of said handlebar;
    h) as said pad rotates about said pivot, the direction of its motion deviates from a theoretical path through the center of the cross section of said handlebar by less than 45 degrees;
    i) a portion of said pad remains within ½ inch of the either the surface of said handlebar, or any gripping surface covering said handlebar.

2. The mechanism of claim 1 where the pad is mounted to a slidable member which moves along a fixed path in relation to said handlebar.

3. The mechanism of claim 1 where the pad is affixed to a member having two pivots:
    a) attached to the handlebar is at least one member also fitted with two pivots;
    b) one end of a linkage piece connects to one of the pivots on the member attached to said pad and the other end of said linkage piece connects to one of the pivots on said member which is attached to said handlebar;
    c) a second linkage piece connects to the remaining pivot on said member attached to the handlebar and to the remaining pivot on the said member attached to said pad;
    d) two said linkage pieces attach to the four pivot locations in such a manor that the two said linkage pieces do not cross one another.

4. The mechanism of claim 1 where the handle bar has a cross section which is not tubular, but where the portion of said handlebar onto which a typical rider would grasp has a consistent cross section:
    a) motion of said pad in comparison to said handlebar should be such that motion of said pad should follow a path whose direction that never diverts from a theoretical pat through the center of the profile of said handlebar by more than 45 degrees.

5. The mechanism of claim 1 where the handle bar has a cross section which is not tubular and where the portion of said handlebar onto which a typical rider would grasp has an inconsistent cross section:
    a) motion of said pad in comparison to said handlebar should be such that motion of said pad should follow a path whose direction does not divert by more than 45 degrees from a theoretical path defined by a line drawn through the center of the petacarpophalangeal joints of the ring and index fingers of a hand grasping the section of the handle bar to which said mechanism is affixed.

6. On a motorized vehicle equipped with handlebars:
    a) mounted to said handlebars is a throttle control with a movable pad which captures the motion of a rider's thumb;
    b) an electrical potentiometer is connected to at least one member rigidly connected to said handlebar and to either said movable pad directly or at least one member connected to said movable pad;
    c) motion of said movable pad in relation to said handlebar alters the electrical signal generated by said electronic potentiometer;
    d) the power output of the motor of said vehicle is regulated by the flow of combustibles through a gate valve to the motor;
    e) a servo motor is mechanically connected to said gate valve;
    f) movement of the armature of said servo motor opens and closes said gate valve;
    g) actuation of said servo motor is dependent on the electrical signals generated by said potentiometer.

7. The mechanism of claim 6 where an ultrasonic position sensor generates an electrical output dependent on the relationship between said movable pad and said handlebar.

8. The mechanism of claim 6 where an optical sensor generates an electrical output dependent on the relationship between said moveable pad and said handlebar.

9. The mechanism of claim 6 where a stepper motor opens and closes said gate valve.

10. A vehicle equipped with a thumb throttle control which is actuated by the movement of the thumb of the vehicle's rider:
   a) said vehicle is powered by an internal combustion engine;
   b) combustibles consumed by said internal combustion engine travel through an orifice whose flow is regulated by a gate valve consisting of a gate valve body in which a slidable gate moves to restrict flow through a section of the orifice running through said gate valve body;
   c) movement of said slidable gate in said gate valve body correlates to the actuation of said thumb throttle control;
   d) a secondary mass equivalent to that mass of said slidable gate exists in close vicinity to said slidable gate;
   e) said secondary mass moves along a path parallel to path along which said slideable gate valve moves;
   f) a mechanical linkage incorporating a mechanical lever harnesses the motion of said slidable gate so that the secondary mass is moved in a direction opposite that of said slidable gate.

11. The mechanism of claim 10 where motion of said slideable gate is conveyed to the secondary mass by one or more cables.

12. The mechanism of claim 10 where motion of said slideable gate is conveyed to the secondary mass by one or more belts.

13. The mechanism of claim 10 where motion of said slideable gate is conveyed to the secondary mass by one or more chains.

14. The mechanism of claim 10 where motion of said slideable gate is conveyed to the secondary mass by opposing hydraulic cylinders.

15. The mechanism of claim 10 where motion of said slideable gate is attached to a gear rack in such a manner that when said slideable gate moves through its path of travel:
   a) the teeth on said gear rack rotate a gear rotating on a shaft running perpendicular to the motion of said slideable gate;
   b) a gear rotating in relation to the rotation of said shaft drives a second gear rack in a direction opposite the motion of said slideable gate;
   c) the second gear rack is attached to a secondary mass;
   d) the mass of said slideable gate and said gear rack attached to it is proportional to the mass of said second gear rack and said secondary mass.

16. The mechanism of claim 10 where a discrepancy in the mass of said slideable gate and said secondary mass is compensated for by coupling the two objects such that the lighter object moves a distance proportionally more than the heavier object.

17. The mechanism of claim 10 where the motion of said slideable gate is opposed by more than one said secondary mass.

18. The mechanism of claim 10 where geometry constraints force some small discrepancy in the direction of motion of said slideable gate and said secondary mass.

* * * * *